(12) United States Patent
Balakrishnan et al.

(10) Patent No.: US 11,178,021 B2
(45) Date of Patent: Nov. 16, 2021

(54) SYSTEM AND METHOD FOR VISUALLY MANAGING COMPUTING DEVICES IN A DATA CENTER

(71) Applicant: Core Scientific, Inc., Bellevue, WA (US)

(72) Inventors: Ganesh Balakrishnan, Sammamish, WA (US); Thomas Fuller, Seattle, WA (US); Chandra Ponneganti, Sammamish, WA (US); Kristy-Leigh Minehan, Kirkland, WA (US)

(73) Assignee: Core Scientific, Inc., Bellevue, CA (US)

( * ) Notice: Subject to any disclaimer, the term of this patent is extended or adjusted under 35 U.S.C. 154(b) by 0 days.

(21) Appl. No.: 16/707,870

(22) Filed: Dec. 9, 2019

(65) Prior Publication Data

US 2021/0028999 A1 Jan. 28, 2021

Related U.S. Application Data

(60) Provisional application No. 62/877,737, filed on Jul. 23, 2019.

(51) Int. Cl.
*G06F 11/30* (2006.01)
*H04L 12/24* (2006.01)
(Continued)

(52) U.S. Cl.
CPC .......... *H04L 41/22* (2013.01); *G06F 11/3006* (2013.01); *G06F 11/323* (2013.01);
(Continued)

(58) Field of Classification Search
CPC ... H04L 41/22; H04L 41/0631; H04N 1/0049; G06F 11/3006; G06F 11/323; G06T 17/00; G06T 19/006
See application file for complete search history.

(56) References Cited

U.S. PATENT DOCUMENTS 6,744,436 B1 * 6/2004 Chirieleison, Jr. .. G06Q 10/087
345/419
7,652,889 B2 * 1/2010 Larson ................. H05K 7/1498
361/749

(Continued)

OTHER PUBLICATIONS

Patel et al. "Thermal considerations in cooling large scale high compute density data centers." 1-20 In: ITherm 2002, Eighth Intersociety Conference on Thermal and Thermomechanical Phenomena in Electronic Systems. Jun. 1, 2002 (Jun. 1, 2002) Retrieved on Sep. 20, 2020 (Sep. 20, 2020) from <http://shiftleft.com/mirrors/www.hpl.hp.com/research/papers/2002Ithermal_may02.pdf>.

(Continued)

*Primary Examiner* — Said Broome
(74) *Attorney, Agent, or Firm* — Fishman Stewart PLLC

(57) ABSTRACT

A system and method for managing large numbers of computing devices such as cryptocurrency miners in a data center are disclosed. A three-dimensional (3D) model of the data center is created using machine-readable codes. The 3D model includes device and bin location information. Status data is captured from the computing devices, associated with location, stored in a database, and used to populate the 3D model, which is rendered in various two-dimensional and 3D views to provide the user with information helpful in managing the data center.

20 Claims, 9 Drawing Sheets

(51) Int. Cl.
  *H04N 1/00*     (2006.01)
  *G06F 11/34*    (2006.01)
  *G06T 17/00*    (2006.01)
  *G06T 19/00*    (2011.01)
  *G06F 11/32*    (2006.01)
  *G06N 20/00*    (2019.01)
  *H04L 12/26*    (2006.01)
  *G06F 9/4401*   (2018.01)

(52) U.S. Cl.
  CPC ......... *G06F 11/3495* (2013.01); *G06N 20/00* (2019.01); *G06T 17/00* (2013.01); *G06T 19/006* (2013.01); *H04L 41/046* (2013.01); *H04L 41/0631* (2013.01); *H04L 41/0823* (2013.01); *H04L 41/0876* (2013.01); *H04L 41/145* (2013.01); *H04L 41/16* (2013.01); *H04L 41/20* (2013.01); *H04L 43/04* (2013.01); *H04L 43/065* (2013.01); *H04L 43/0817* (2013.01); *H04N 1/0049* (2013.01); *G06F 9/4401* (2013.01)

(56) References Cited

U.S. PATENT DOCUMENTS

| | | |
|---|---|---|
| 2006/0171538 A1 | 8/2006 | Larson et al. |
| 2011/0057803 A1* | 3/2011 | Yamaoka ........... H05K 7/20836 340/584 |
| 2011/0241833 A1 | 10/2011 | Martin et al. |
| 2012/0249588 A1 | 10/2012 | Tison et al. |
| 2013/0221096 A1 | 8/2013 | Ashok et al. |
| 2017/0033839 A1 | 2/2017 | Abbondanzio et al. |

OTHER PUBLICATIONS

International Search Report dated Oct. 6, 2020 related to corresponding application PCT/US2020/043086.

Transcript with selected screenshots of "Firmware for ASIC S9. 20 Th/s." video posted to Youtube on Apr. 16, 2019; <https://www.youtube.com/watch7v=Sp_vg5_31U4>; accessed Mar. 29, 2021.

Transcript with selected screenshots of "VNISH Smart Mine Antminer S9 Firmware Special Edition, Virus Blocking. Fee 1.7%-1.8%" video posted to Youtube May 21, 2019; <https://www.youtube.com/watch?v=Py9e7n73rtl>; accessed Mar. 29, 2021.

* cited by examiner

SYSTEM AND METHOD FOR VISUALLY MANAGING COMPUTING DEVICES IN A DATA CENTER

CROSS-REFERENCE TO RELATED APPLICATIONS

This application claims priority to U.S. Provisional Patent Application Ser. No. 62/877,737, filed on Jul. 23, 2019, and titled "COMPUTING SYSTEM", the contents of which are hereby incorporated by reference in their entirety.

TECHNICAL FIELD

The present disclosure generally relates to the field of computing and, more particularly, to systems and methods for managing a plurality of computing devices such as miners in a data center.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Many cryptocurrencies (e.g., Bitcoin, Litecoin) are based on a technology called blockchain, in which transactions are combined into blocks. These blocks are stored with previous blocks of earlier transaction into a ledger (the "blockchain") and rendered immutable (i.e., practically unmodifiable) by including a hash. The hash is a number that is calculated based on the blocks and that meets the blockchain's particular criteria. Once the block and hash are confirmed by the cryptocurrency network, they are added to the blockchain. The hashes can be used to verify whether any of the prior transactions or blocks on the blockchain have been changed or tampered with. This creates an immutable ledger of transactions and allows the cryptocurrency network to guard against someone trying to double spend a digital coin.

Many cryptocurrency networks consist of a large number of participants that repeatedly attempt to be the first to calculate a hash meeting the blockchain network's requirements. They receive a reward (e.g., a coin reward or transaction fee reward) that motivates them to continue participating (mining).

Many blockchain networks require computationally difficult problems to be solved as part of the hash calculation. The difficult problem requires a solution that is a piece of data which is difficult (costly, time-consuming) to produce, but is easy for others to verify and which satisfies certain requirements. This is often called "proof of work". A proof of work (PoW) system (or protocol, or function) is a consensus mechanism. It deters denial of service attacks and other service abuses such as spam on a network by requiring some work from the service requester, usually meaning processing time by a computer.

Participants in the network operate standard PCs, servers, or specialized computing devices called mining rigs or miners. Because of the difficulty involved and the amount of computation required, the miners are typically configured with specialized components that improve the speed at which hashes or other calculations required for the blockchain network are performed. Examples of specialized components include application specific integrated circuits (ASICs), field programmable gate arrays (FPGAa), graphics processing units (GPUs) and accelerated processing unit (APUs).

Miners are often run for long periods of time at high frequencies that generate large amounts of heat. Even with cooling (e.g., high speed fans), the heat and constant operation can negatively impact the reliability and longevity of the components in the miners. ASIC miners for example have large numbers of hashing chips (e.g., 100's) that are more likely to fail as temperatures rise.

Many participants in blockchain networks operate large numbers (e.g., 100's, 1000's or more) of different miners (e.g., different generations of miners from one manufacturer or different manufacturers) concurrently in large data centers. These data centers and large numbers of miners can be difficult to manage. Data centers housing large numbers of miners or other ASIC- or GPU-based systems have different challenges than traditional data centers housing more general computers. This is due to the significantly higher density, including higher power usage, higher heat generation, and near constant compute-intensive operation.

The constant operation at high temperatures often leads to component failures (e.g., broken fan or burnt-out chip). These failures require service personnel to physically locate the particular devices with the failed components (amongst thousands of devices) in order to service the device and replace the failed components. In very large data centers, there can be significant numbers of units failing each day, both for known and unknown reasons.

When a device is malfunctioning, a typical solution for the data center technician is to connect to the device's control interface (e.g., via network connection) and turn on or flash one of the computing device's status LED indicators. This allows the technician to more easily find the malfunctioning device amongst the hundreds or thousands of devices operating in the data center. Unfortunately, there are many types of errors for which this technique does not work. For example, failures in the network interface, control board, power supply, or LED itself could render this process problematic. Also locating the particular area of the data center where the problematic device is in order to even see the LED flashing can be difficult.

Another shortcoming of traditional data center management techniques relates to identifying hidden causes of errors. Computing device and environmental status information is typically captured and presented separately in static tables or spreadsheets, which often do not provide useful insight into potential underlying causes for the computing device failures.

For at least these reasons, there is a desire for a solution to allow for improved management of large numbers of computing devices such as miners in a data center.

SUMMARY

A method and system for more easily managing a data center with a plurality of computing devices such as miners is contemplated. In one embodiment, the method comprises creating a three-dimensional (3D) model of the data center including bin location information, and associating machine-readable codes to each computing device and bin. The computing device's and bin's codes are scanned to associate a particular computing device to a particular bin location. Status data is then captured from the computing device and associated with its bin location when it's stored.

The data is used to populate the 3D model, which is then rendered for the user to provide information helpful in managing the data center.

Example computing devices include, for example, ASIC miners, FPGA miners, and GPU miners, but other computing device types are possible and contemplated. The 3D model may be rendered to include bin orientation information and may include a shape representing each of the computing devices at a location in the 3D model that corresponds to its real-world bin location. The color or pattern of the rendered shape may vary in relation to the captured status data, including for example, temperature, fan speed, voltage level, operating frequency, hash rate, hash efficiency (e.g., hashes calculated per energy used), and error status.

In some embodiments, the 3D model may be rendered to create an augmented reality view by rendering shapes for particular computing devices with a problematic status on top of a live video stream, wherein the rendered shapes are positioned to appear at positions that correspond to the computing devices' real world locations.

A system for managing computing devices operating in a data center is also contemplated. In one embodiment, the system includes a first set of machine-readable codes that are associated with physical locations in the data center and a second set of machine-readable codes that are each associated with one of the computing devices. The system may include a number of modules, with one module configured to create a 3D model of the data center, another module configured to associate each particular computing device with a particular physical location based on scanned pairs of the machine-readable codes (one device and one location). A third module may be configured to capture operational status data from the computing devices (e.g., via a network), and a fourth module may be configured to render a 3D view of the data center model. The 3D view may include a number of shapes, each representing one of the computing devices and each positioned according to the associated position of the computing device. Shapes for racks and other features in the data center (e.g., walls) may also be optionally rendered. The shape's appearance may be a function of the operational status data of the corresponding device (e.g., color coding based on status). The system may also include a printer configured to print the machine-readable codes, and a scanning device configured to read and transmit the machine-readable codes. The system may also include a module configured to display an exploded replacement part view for a particular computing device when selected by a user in the 3D model.

The system may be implemented in software as instructions executable by a processor of a computational device, and the instructions may be stored on a non-transitory, computer-readable storage medium such as a flash memory drive, CD-ROM, DVD-ROM, or hard disk. When executed, the system may prompt a user to enter a 3D model of the data center with bin location and orientation information. The user may also be prompted to associate a computing device with a bin location by scanning a machine-readable code associated with the computing device and a machine-readable code associated with the bin location. The system may be configured to periodically capture status data from the computing devices and associate the captured status data with the bin location associated with the corresponding computing devices. A 3D model with a shape representing the computing device may be rendered for the user. A two-dimensional overhead view including cumulative counters for device status errors in each subsection of the data center may also be rendered. An exploded replacement part view for a particular one of the plurality of computing devices may also be rendered when selected by a user in the 3D model.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Figure 1:
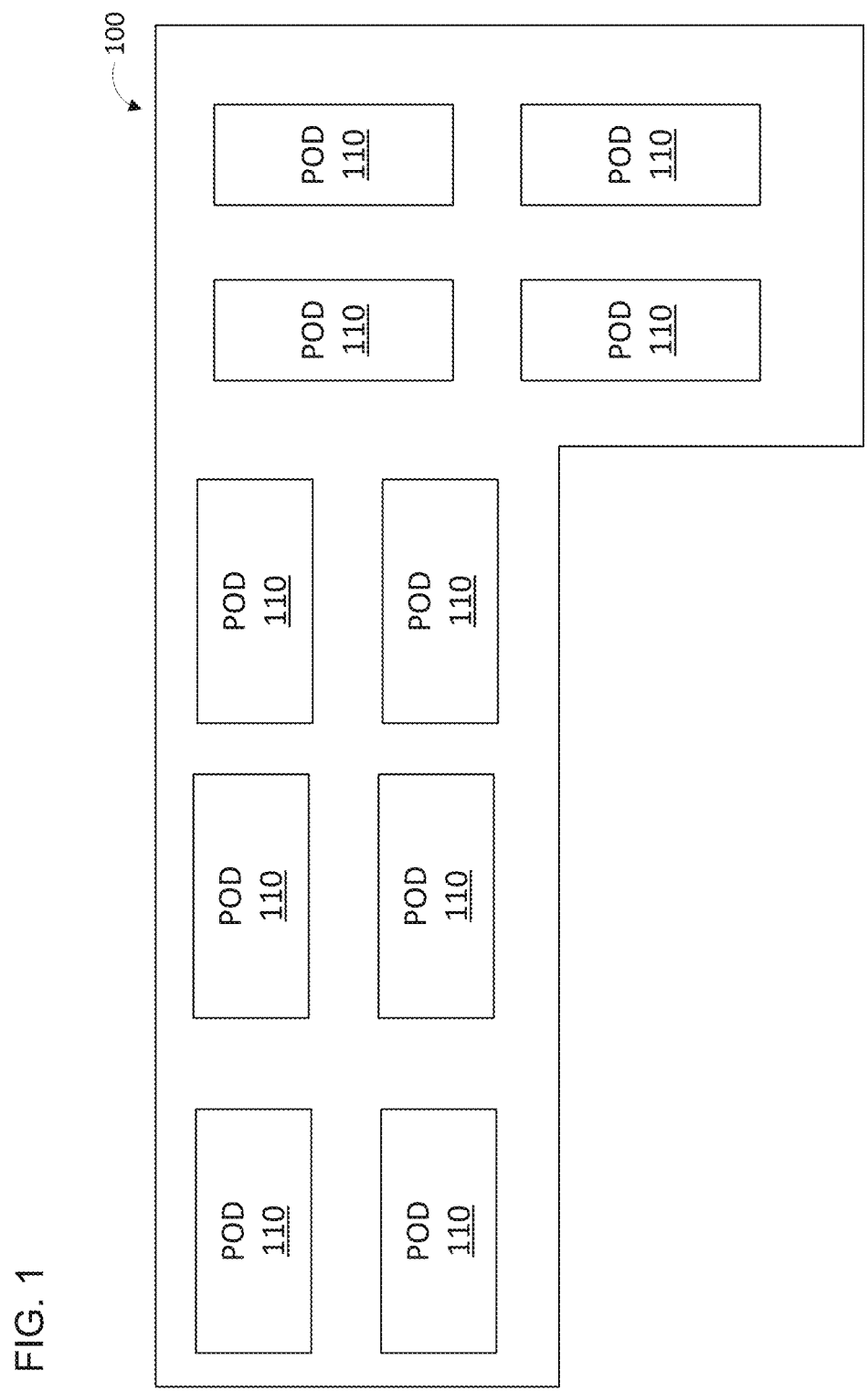
FIG. 1 is a top-down view of one example of a data center for computing devices.

Referring now to FIG. 1, a top-down view of one example of a data center 100 for computing devices is shown. The data center 100 is configured with a large number of pods 110. Pods are standardized blocks of racks, either in a row or (more typically) a pair of rows, that share some common infrastructure elements like power distribution units, network routers/switches, containment systems, and air handlers. For example, a pod may have two parallel racks of devices, spaced apart and each facing outwards. The devices on the racks may all be oriented to pull cool air in from outside the pod and discharge the hot air (heated by the computing devices) into the empty space in the center of the pod where the hot air then rises up and out of the data center. For example, there may be hot air ducts positioned above the middle of each pod to capture the hot waste air and then discharge it out of the data center via vents in the roof of the data center.

Figure 2:
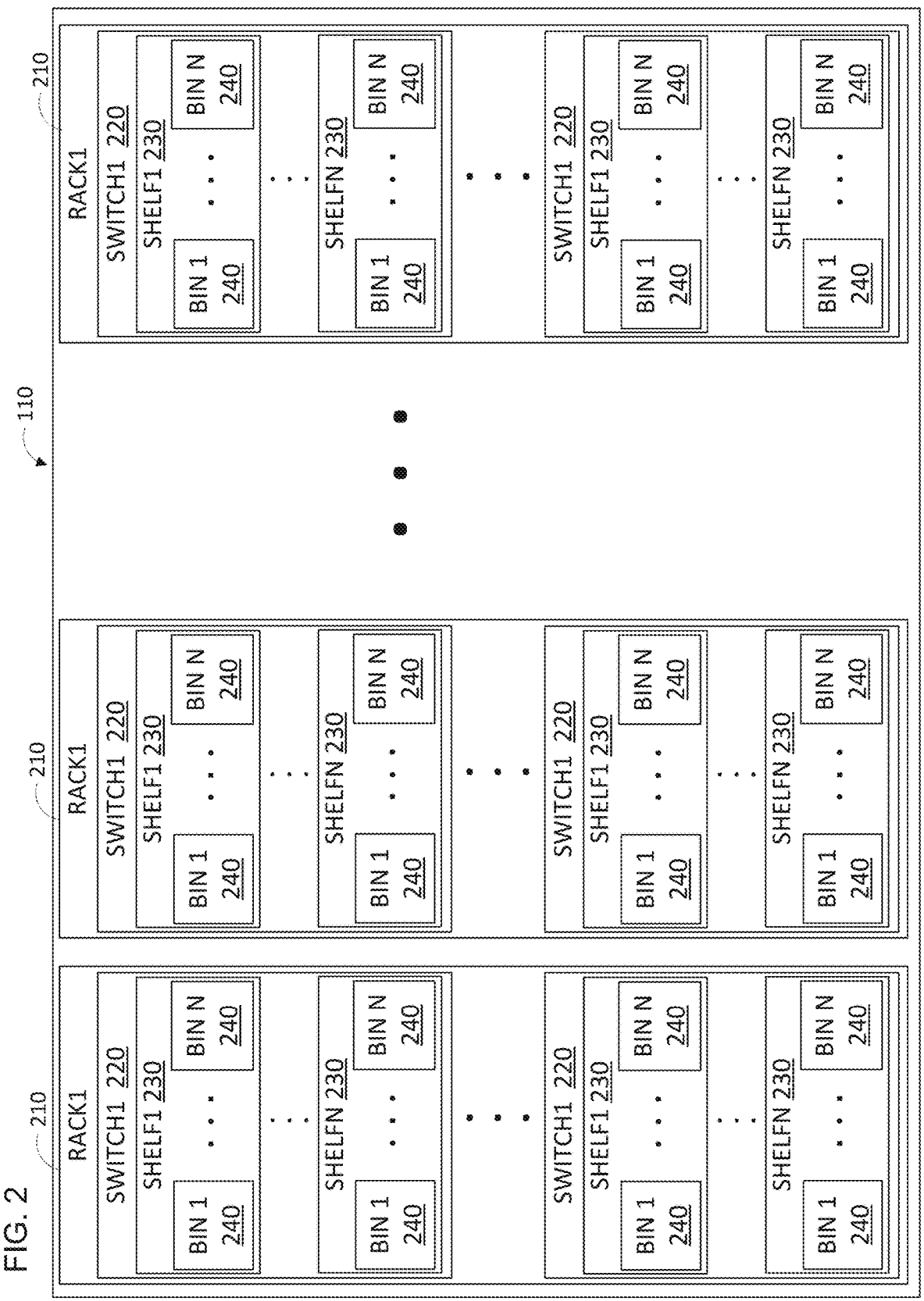
FIG. 2 is a front view of one example of a pod in a data center for computing devices.

Turning now to FIG. 2, the front side of one example of a pod 110 is shown. The pod 110 has a number of racks 210 that each have a number of shelves 230 for holding computing devices. For organization and management purposes, the shelves may be grouped together in switch sections 220 that are each supported by the same network switch. In each of the shelves 230 there may be multiple bin locations 240 that each hold a single computing device. Each computing device may be installed in a bin with connections for power and a network connection.

Figure 3:
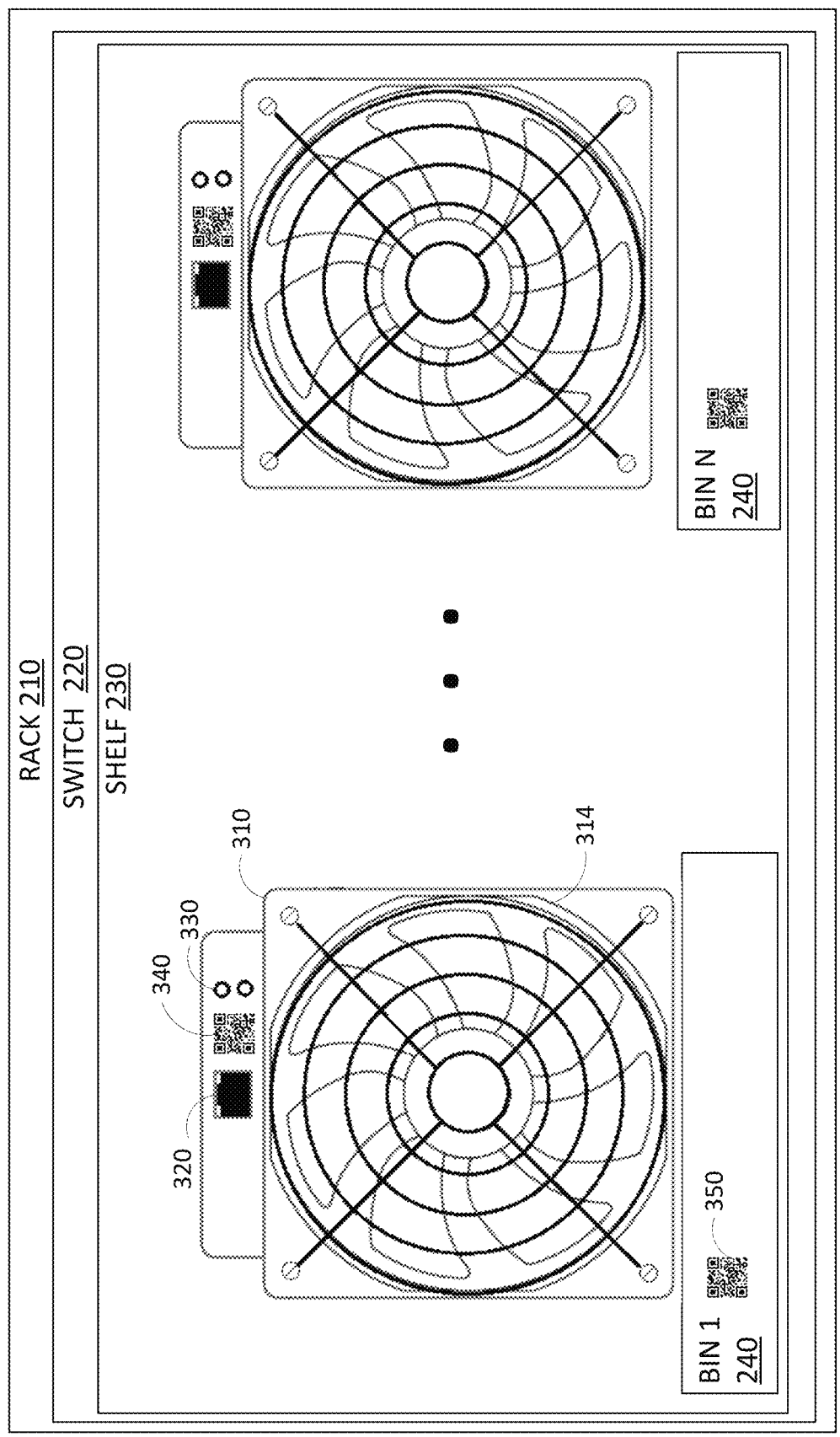
FIG. 3 is an illustration of one example of a portion of a rack for computing devices in a data center.

Turning now to FIG. 3, a more detailed frontal view of one shelf 230 in an example rack 210 is shown. In this example, a computing device 310 is installed in each bin 240 in the shelf 230. In this example, computing device 310 is an ASIC miner. ASIC miners typically include a controller board with a network port 320, one or more status indicator LEDs 330 and a pair of cooling fans (front fan 314 shown) that draw air through the center of the miner where there are multiple hash boards performing calculations and generating heat.

As noted above, one issue facing operators of large data centers is identifying and servicing computing devices with errors. When a device is malfunctioning, one option is to connect to the device's control interface (e.g., via network connection 320) and turn on or flash the device's status indicator LEDs 330. This allows the data center service technician to more easily find the malfunctioning device amongst the hundreds or thousands of devices operating in the data center. Unfortunately, there are many types of errors for which this technique does not work. For example, failures in the network interface, control board, power supply, or LED itself could render this process problematic. Determining the cause of device failures is also difficult.

For at least these reasons, an improved system for managing large numbers of computing devices is needed. In one embodiment, the system includes the use of a machine-readable code 340 affixed to (or near) the computing devices 310, and a second machine-readable code 350 affixed to (or near) the bin 240. While QR codes are illustrated, other types of machine-readable codes are possible and contemplated, including for example barcodes and near-field communication (NFC) contact-less radio frequency identification (RFID) tags.

Figure 4:
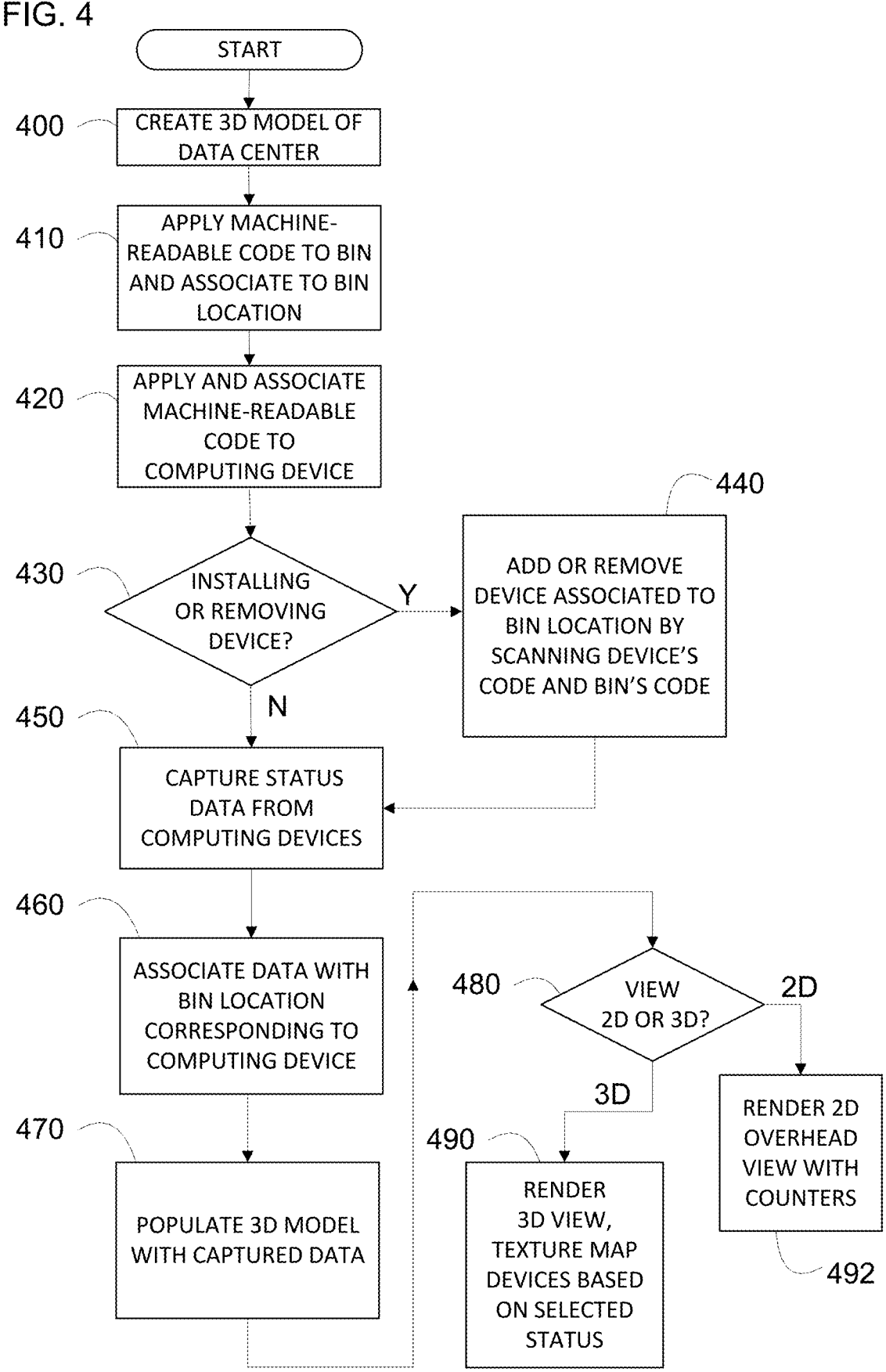
FIG. 4 is a flow chart of an example embodiment of a method for managing computing devices in a data center according to the teachings of the present disclosure.

Turning now to FIG. 4, a flow chart is shown illustrating an example embodiment of a method for managing computing devices in a data center according to the teachings of the present disclosure. An initial 3D model is created of the data center (step 400). In one embodiment, a data center management application may be configured to create the 3D model of the data center by prompting a user (e.g., data center administrator or technician) for several basic measurements. For example, the user may be prompted to enter the following information for each pod: the x- and y-coordinates, length, width, orientation, height, rows of racks per pod (e.g., single or double), number of racks per row, orientation of racks, number of shelves per rack, number of bins per shelf. In some embodiments, additional information such as the x- and y-coordinates of the data center's walls may also be prompted. In another embodiment, the 3D model may be generated by the user using a traditional 3D drawing, modeling or CAD program and then imported by the data center management application.

Machine-readable codes are applied to bin locations in the data center and associated with each bin's location (step 410). In one embodiment, as part of the 3D model's initial setup, the data center management application may be configured to prompt the user to scan each bin code and then enter corresponding location information (e.g. x-, y-, z-coordinates or pod/rack/shelf/bin numbers). In another embodiment, the user may enter this information in a spreadsheet that can be imported into the management application. Note that depending on the implementation, not only 2D location information can be associated with each bin, but also height information as well.

Machine-readable codes are also applied to, and associated with, the computing devices being managed (step 410). This information is preferably stored into a database that is accessible by the data center management application. In one embodiment, the management application may be configured to prompt the user to scan the code associated with a particular computing device and then enter corresponding information (e.g., device manufacturer, model, configuration, MAC address, maximum and minimum voltage levels, operating frequencies, fan speeds, and expected hash rates). In another embodiment, the management application may be configured to import this information from a spreadsheet.

When a computing device is installed, moved, or removed from the data center (step 430), the data center technician may easily update the database by simply scanning the device's code and the corresponding bin's code (440). In one embodiment the management application may them prompt the user to confirm the operation to be performed (e.g. install, move or remove the device). In this way, the database may be easily maintained with up-to-date information regarding which computing device is in which bin location.

Once computer devices are configured and entered into the database, status data from the devices may be captured (step 450). In one embodiment, this is implemented in the data center management application by periodically polling the configured computing devices with status queries including temperature, operating frequency, fan speed (two sets for many ASIC miners), any errors experienced, and hash rate (for miners). The status data received from the computing devices may be stored to the management application's database and associated therein with the device and bin location from which it was received (step 460).

The 3D model of data center may then be populated by the captured status data (step 470). The management application may provide multiple views in order to make the data more usable to the user, and the user may be prompted to select which of the multiple views is desired (step 480). In one embodiment, both 2D and 3D views are offered.

In response to the user selecting the 3D view, the management application may be configured to present a rendered 3D view of the data center incorporating the received status information for the computing devices according to their associated bin location in the 3D model (step 490). In one embodiment, each computing device is represented by a simplified shape or collection of shapes (e.g., rectangular prism), and at least the front side of the shape is texture mapped in a texture that corresponds to a selected one of the captured statuses for the bin location. For example, if the user selects to view temperature information, the color of one or more sides of the shape may vary from blue (representing a low temperature) to red (representing a high temperature). In another example, if the user selects a 2D view, a 2D overhead representation of the data center pods may be rendered and displayed (step 492) with summary information (e.g., counters for the number of devices in each pod with errors).

Figure 5:
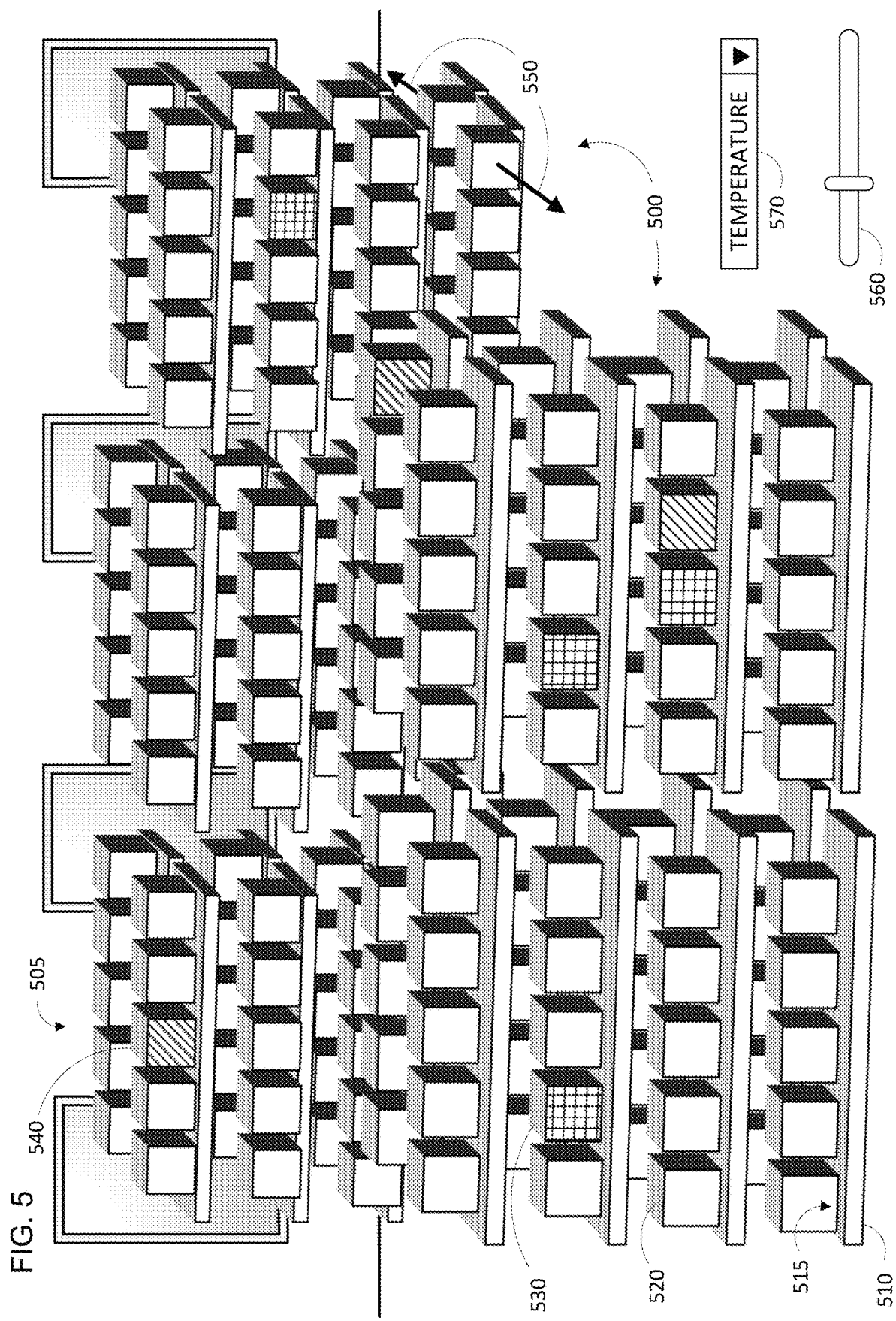
FIG. 5 is an illustration of one example of a rendered 3D model of a data center according to the teachings of the present disclosure.

Turning now to FIG. 5, an illustration of one example of a rendered 3D data center model is shown. The model includes 3D representations of pods 500, racks 505, shelves 510, bins 515 and computing devices 520. As described earlier, in one embodiment the shapes representative of the computing devices in the bins may be rendered in different patterns, colors, or textures (e.g., texture mapped on one or more sides) based on the computing devices status. For example, a computing device with a malfunctioning fan or failed hash chips may be rendered in a red pattern on the first side. This is illustrated with shapes 530 and 540. By capturing rack orientation information as described earlier, device orientation may be properly rendered even with a single side indicating status, as shown by orientation arrows 550.

In one embodiment, the 3D model may be presented by the management application for viewing to the user (e.g. data center technician) via a web interface or via a mobile app. The management application may permit the user to interact with the rendering, for example to change the viewport orientation or zoom level (e.g., by tapping or pinching a touch screen or pressing a key combination on a keyboard). The application may also provide the user with interface controls to select the status data to be displayed in the rendering. For example, a drop-down menu 570 may be displayed to allow the user to select status data such as temperature, fan speed, error status, and hash rate. The rendering module may then update the 3D view to reflect which computing devices have problematic status for the particular selected status. In another embodiment, multiple status may be selected at once, and the rendering module may be configured to overlay the error colors or patterns for computing devices that have multiple problematic statuses.

In some embodiments, the management application may also display a control 560 for navigating which time period the status information is displayed for. For example, control 560 may be a time base slider that the user can move back and forth to show status data over the past hours or days to help spot trends occurring over time (e.g., multiple machines in a particular area of the data center failing at particular times of the day) that are not easily determinable by viewing traditional data center status information statically in tables.

Figure 6:
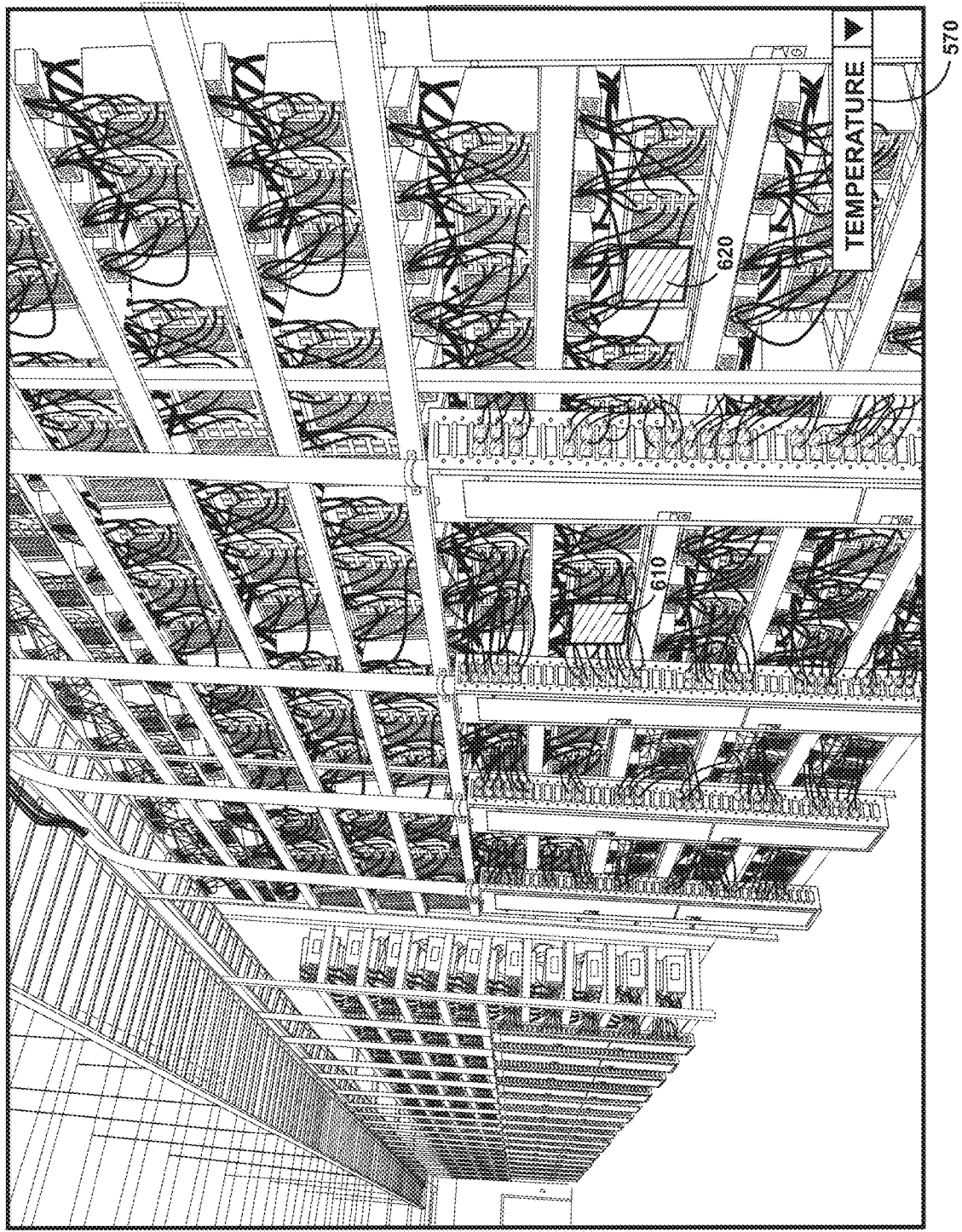
FIG. 6 is an illustration of another example of a rendered 3D data center model using augmented reality according to the teachings of the present disclosure.

Turning now to FIG. 6, another example of the rendered 3D data center model is shown, this time using augmented reality to overlay the 3D model data onto live video captured by the user's mobile device's camera. In this embodiment, only compute devices with problems (based on the status data of interest selected in menu 570) are rendered. In some embodiments only one surface representative of the problem (preferably the front surface) is rendered. This is shown in the illustration by shapes 610 and 620. The shapes may be rendered semi-transparent as shape 620 illustrates or opaque as shape 610 illustrates. This view is rendered in 3D that is overlaid onto the live video from the user's mobile device or augmented reality device or headset such that the shapes representing the problematic devices appear as if they are in the real-world location corresponding to the problematic devices as viewed by the user. This may beneficially assist the user in quickly locating the problematic devices, even if the device's indicator LED is not operating as intended or if power is off for the particular pod or rack. This may also beneficially assist the user in identifying patterns or clusters of problematic devices that might indicate a need for future investigation (e.g. bad air flow to a particular area of a pod in the data center due to a clogged air filter).

The user may use an augmented reality headset or a standard mobile device for viewing the augmented reality 3D view, but the viewing device must provide sufficient sensor data to permit the management application to accurately determine the device's position and orientation within the data center. This allows the management application to determine where in the 3D model's viewport the camera (used for rendering) should be positioned and in what direction. In an alternate embodiment, the datacenter may be configured with multiple fixed cameras attached to the racks in the data center at known x-y-z positions, and the management application may perform real-time (or near real-time) object detection and user position and orientation calculations on the image streams from the cameras in order to determine the user's position and orientation.

In some embodiments, the management application may be configured to detect when the user selects the representation of a problematic computing device (e.g., by clicking or tapping on shape 530 or 540 shown in FIG. 5 or shapes 610 or 630 shown in FIG. 6) and present a user interface with service and repair information corresponding to the particular computing device. For example, the management application may provide one or more additional pages (e.g., hardware tear-down pages) that may zoom in on, include information associated with, and/or include graphics associated with the selected other computing device(s) or components thereof, such as graphics of fans, power supplies, and/or hash boards. A user may select the components/graphics to view additional information about the component and/or to modify parameters associated with the component (e.g., change fan speed, chip voltage, chip frequency, voltage regulator settings, buck controller settings, MOSFET settings, etc.). The management application may provide one or more additional pages for viewing or modifying subcomponents of the components (e.g., pages for hash boards, each chip of a hash board, pin diagrams, datasheets for components, component connections, wiring diagrams, etc.).

Figure 7:
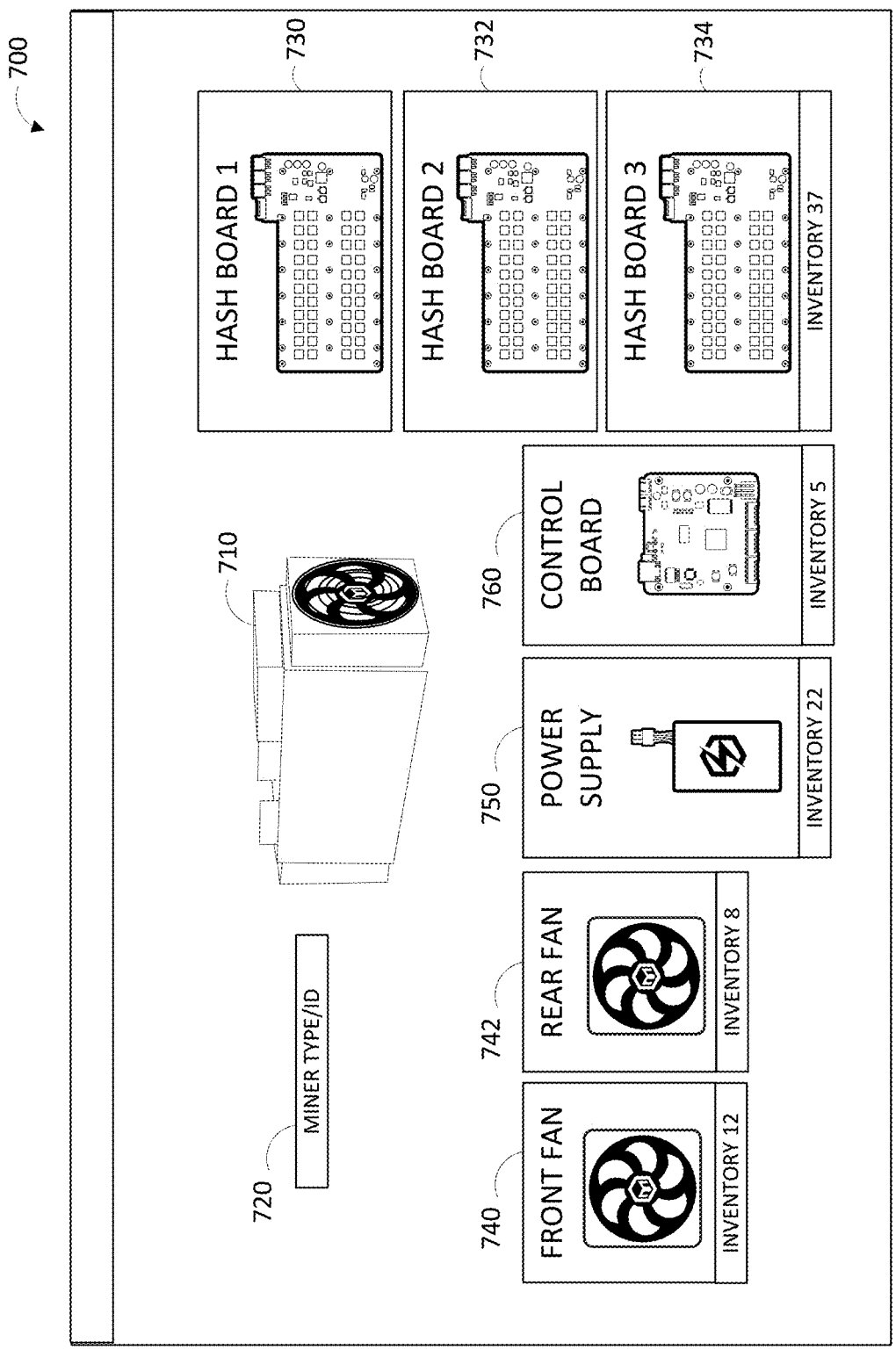
FIG. 7 is an illustration of an example embodiment of a user interface for servicing computing devices in a data center according to the teachings of the present disclosure.

Turning now to FIG. 7, an illustration of an example embodiment of such a user interface for servicing computing devices in a data center is shown. A more detailed representation 710 (e.g., image or 3D rendering) of the particular computing device may be displayed together with id information 720 such as the brand and model number. Representations of replaceable parts such as front fan 740, rear fan 742, power supply 750, control board 760, and hash boards 730, 732 and 734 may be displayed, together with corresponding inventory levels for each of the parts.

Figure 8:
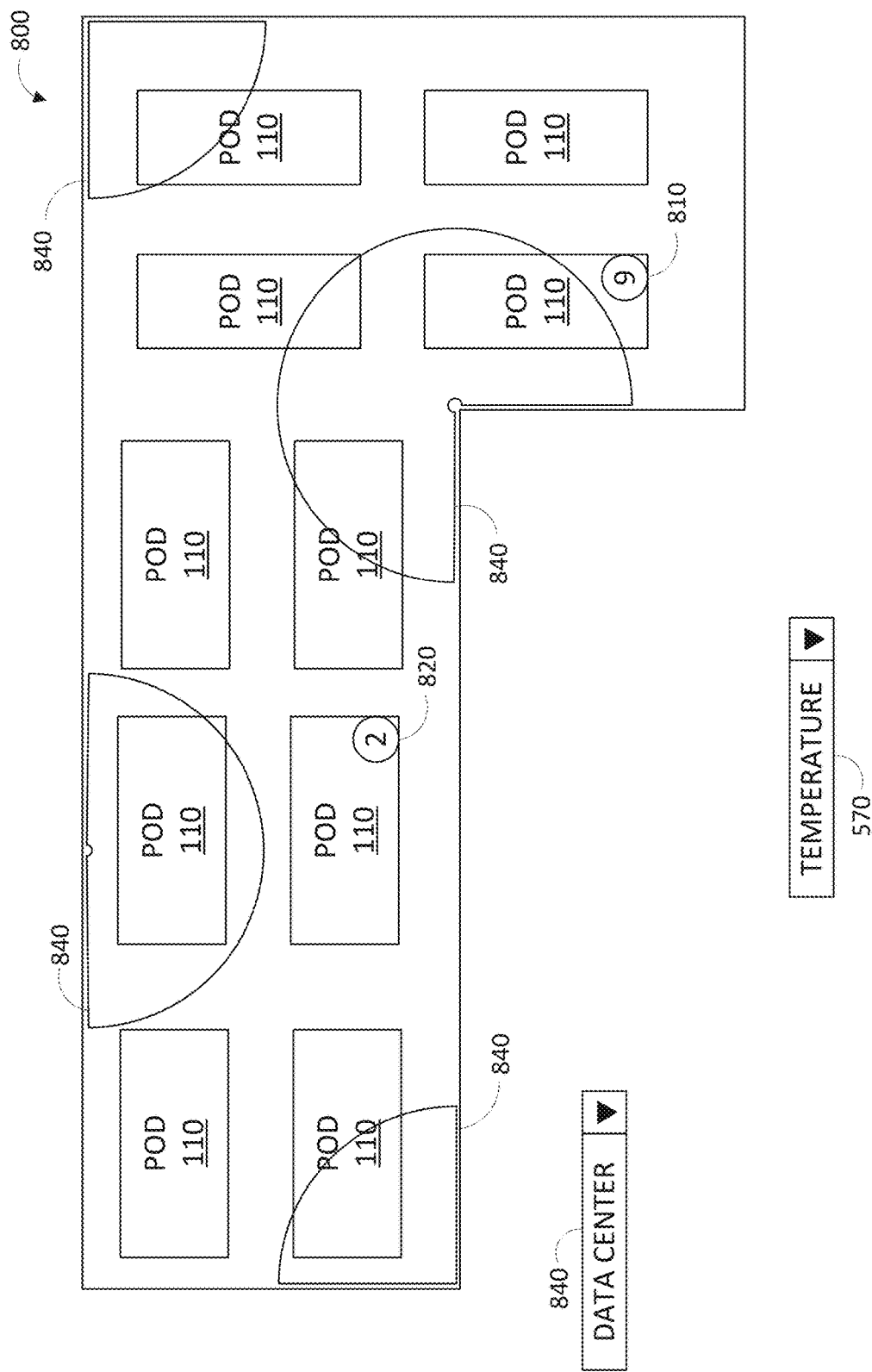
FIG. 8 is an illustration of an example embodiment of a two-dimensional overview of a 3D model of a data center according to the teachings of the present disclosure.

Turning now to FIG. 8, an illustration of an example embodiment of a two-dimensional (2D) overview of a 3D model of a data center is shown. In response to the user selecting a particular status of interest from dropdown menu 570 (e.g., temperature or hash rate), the management application may calculate and display indicators 810 and 820 on pods showing the total number of computing devices in the pod with problematic status values for the particular selected status of interest. The management application may also permit the user to view data across different data centers by selecting the data center of interest from a navigation menu 840. The navigation menu may include submenus permitting the user to drill down from seeing 2D views of a data center to seeing a 2D representation of a particular pod in the selected data center, then to a particular rack in the selected pod, and so on down to a particular bin of interest. Additional sensor data may also be incorporated into the model, for example network-enabled temperature sensor data may be rendered in the view as regions 840 which may be color coded based on the level of temperature sensed (e.g., blue or clear for an acceptable lower temperature and varying shades of red for higher more problematic temperatures).

Figure 9:
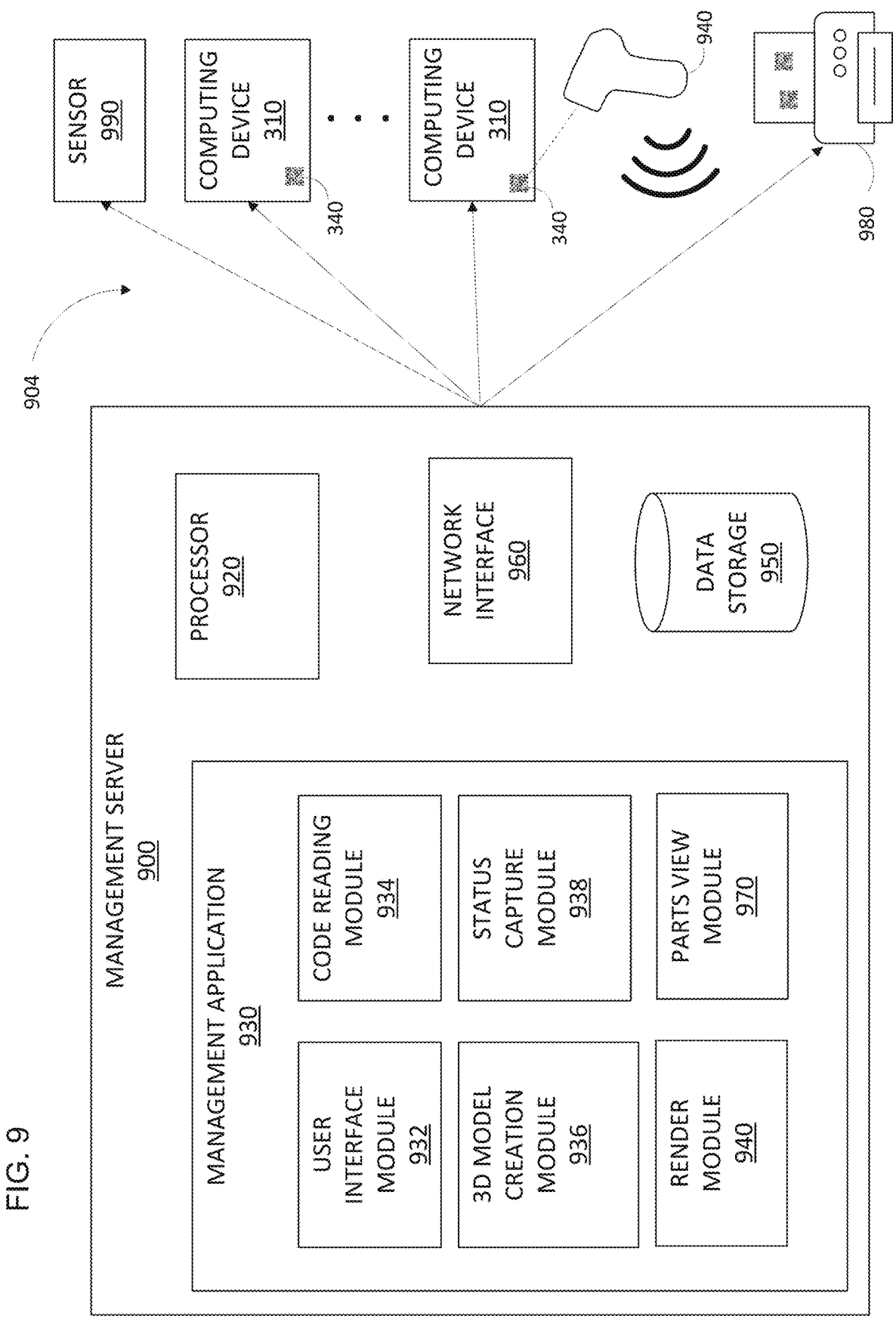
FIG. 9 is an illustration of an example embodiment of a system for managing computing devices in a data center according to the teachings of the present disclosure.

Turning now to FIG. 9, an illustration of an example embodiment of a system for managing computing devices in a data center is shown. In this embodiment the system comprises a large number of computing devices 310 (e.g., miners) each configured with a corresponding machine-readable code 340. The computing devices 310 communicate over a network 904 with a management server 900 via the server's network interface 960. While wireless networks are possible (and may be preferred for communication with peripherals such as scanning device 940, printer 980, and sensor 990), current computing device density in data centers means wired networks such as ethernet are currently preferred for communications between management server 900 and computing devices 310. Management server 900 may be a traditional PC or server, or specialized appliance. Management server 900 may be configured with one or more processors 920, volatile memory and non-volatile memory such as flash storage or internal or external hard disk (e.g., network attached storage accessible to server 900). Server 900 is configured to execute management application 930 to assist users (e.g., data center technicians) with managing computing devices 310.

Management application 930 is preferably implemented in software (e.g., instructions stored on a non-volatile storage medium such as a hard disk, flash drive, or DVD-ROM), but hardware implementations are possible. Management application 930 may include a number of modules, including for example, a 3D model creation module 936 that receives data from a user and creates a 3D model of the data center, a code reading module 934 that receives codes from scanning device 940 and uses them to associate computing devices with locations in the data center, a status capture module 938 that captures status date from devices 310 via network 904 and stores that data to database 950. Management application 930 may also include a rendering module 940 that renders the 3D model of the data center and representations of the computing devices based on their associated status data as described above. Management application 930 may also include a user interface module 932 configured to permit the user to navigate the application and select items, for example, which status information to display, and which view to display. Management application 930 may also include a parts view module 970 configured to display an exploded replacement parts view and associated inventory levels for a particular one of the plurality of computing devices when selected by the user.

In some embodiments, the system for managing computing devices may also include a handheld scanning device 940 (e.g., a mobile phone with a camera or NFC reader, or a wired or wireless-enabled optical barcode scanner) for scanning machine-readable codes 340 (and the bin-associated codes, not shown in this figure) and communicating them to management server 900. In some embodiments, the system may also include a printer 980 for generating the machine-readable codes (e.g., QR-codes or barcodes on stickers). In other embodiments, machine-readable codes are encoded using NFC RFID tags, and printer 980 is not needed. The system may also include one or more network-enabled sensor 990 providing additional data for the 3D model. Examples types of additional data include temperature data, power usage data (e.g. power used by each rack), and air flow data. As part of the initial configuration of these sensors, their position information (e.g., x-, y-, and z-coordinated within the data center) are associated with each sensor in order to permit the management application 930 to render the sensor's data with shapes position at the corresponding location in the 3D model (and corresponding 3D or 2D view being rendered).

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method for managing a data center housing a plurality of computing devices in a plurality of bins, the method comprising:
    creating a three-dimensional model of the data center, wherein the three-dimensional model comprises three-dimensional bin location information;
    associating a machine-readable code with each computing device;
    associating a machine-readable code with each bin;
    reading a particular computing device's code and a particular bin's code to associate the particular computing device to the particular bin's location;
    capturing status data from the particular computing device via a network connection;
    associating the captured status data with the particular computing device's associated bin's location; and
    rendering the three-dimensional model populated with a representation of the particular computing device based on the captured status data from the particular computing device;
    wherein rendering the three-dimensional model comprises rendering a shape for each of the plurality of computing devices at a location in the three-dimensional model corresponding to the computing device's bin location; and
    wherein the rendered appearance of the shape varies in relation to temperature in the captured status data of the corresponding computing device.

2. The method of claim 1, wherein the plurality of computing devices comprise ASIC miners, FPGA miners, and GPU miners.

3. The method of claim 1, wherein the three-dimensional model further comprises three-dimensional bin orientation information, and wherein the representation of the particular computing device is rendered according to the three-dimensional bin orientation information.

4. A method for managing a data center housing a plurality of computing devices in a plurality of bins, the method comprising:
    creating a three-dimensional model of the data center, wherein the three-dimensional model comprises three-dimensional bin location information;
    associating a machine-readable code with each computing device;
    associating a machine-readable code with each bin;
    reading a particular computing device's code and a particular bin's code to associate the particular computing device to the particular bin's location;
    capturing status data from the particular computing device via a network connection;
    associating the captured status data with the particular computing device's associated bin's location; and
    rendering the three-dimensional model populated with a representation of the particular computing device based on the captured status data from the particular computing device;
    wherein rendering the three-dimensional model comprises:
    rendering a shape for a selected subset of the plurality of computing devices based on the corresponding status data, and
    overlaying the rendered shapes on a live video stream from a user in positions that appear to the user to correspond to the real-world location of the selected subset of computing devices.

5. A method for managing a data center housing a plurality of computing devices in a plurality of bins, the method comprising:
    creating a three-dimensional model of the data center, wherein the three-dimensional model comprises three-dimensional bin location information;
    associating a machine-readable code with each computing device;
    associating a machine-readable code with each bin;
    reading a particular computing device's code and a particular bin's code to associate the particular computing device to the particular bin's location;
    capturing status data from the particular computing device via a network connection;
    associating the captured status data with the particular computing device's associated bin's location; and
    rendering the three-dimensional model populated with a representation of the particular computing device based on the captured status data from the particular computing device;
    wherein rendering the three-dimensional model comprises:
    rendering a shape for each of the plurality of computing devices at a location in the three-dimensional model corresponding to the computing device's bin location, wherein the rendered color of the shape varies in relation to a selected status of the corresponding computing device.

6. A method for managing a data center housing a plurality of computing devices in a plurality of bins, the method comprising:
    creating a three-dimensional model of the data center, wherein the three-dimensional model comprises three-dimensional bin location information;
    associating a machine-readable code with each computing device;

associating a machine-readable code with each bin;
reading a particular computing device's code and a particular bin's code to associate the particular computing device to the particular bin's location;
capturing status data from the particular computing device via a network connection;
associating the captured status data with the particular computing device's associated bin's location; and
rendering the three-dimensional model populated with a representation of the particular computing device based on the captured status data from the particular computing device;
wherein rendering the three-dimensional model comprises:
rendering a shape for a particular computing device with a problematic status on top of a live video stream, wherein the shape is positioned to appear at a position that corresponds to the computing device's location.

7. The method of claim 5, wherein the rendered color of the shape varies in relation to a hash efficiency of the corresponding computing device.

8. A method for managing a data center housing a plurality of computing devices in a plurality of bins, the method comprising:
creating a three-dimensional model of the data center, wherein the three-dimensional model comprises three-dimensional bin location information;
associating a machine-readable code with each computing device;
associating a machine-readable code with each bin;
reading a particular computing device's code and a particular bin's code to associate the particular computing device to the particular bin's location;
capturing status data from the particular computing device via a network connection;
associating the captured status data with the particular computing device's associated bin's location; and
rendering the three-dimensional model populated with a representation of the particular computing device based on the captured status data from the particular computing device;
wherein rendering the three-dimensional model comprises:
rendering a shape for each of the computing devices at the computing device's associated bin location in the three-dimensional model, and
selecting a camera position for rendering based on the location of a user in the data center as reported by a device of the user.

9. The method of claim 4, wherein the rendered appearance of the shape varies in relation to temperature in the captured status data of the corresponding computing device.

10. The method of claim 8, wherein the device of the user includes an augmented reality display device configured to report the location of the user and orientation information of the user.

11. The method of claim 5, wherein the three-dimensional model further comprises three-dimensional bin orientation information.

12. The method of claim 1, wherein the captured status data comprises device status, fan speed, hash rate, and operating frequency.

13. The method of claim 1, including displaying an exploded replacement part view for a particular one of the plurality of computing devices when selected by a user in the three-dimensional model.

14. The method of claim 5, wherein the captured status data comprises temperature, fan speed, operating frequency, operating voltage, and hash rate.

15. The method of claim 1, including rendering a two-dimensional overhead view of the three-dimensional model including cumulative counters for device status errors within each subsection of the data center.

16. The method of claim 5, including displaying an exploded replacement part view for a particular one of the plurality of computing devices when selected by a user in the three-dimensional model.

17. The method of claim 5, wherein the selected status includes temperature.

18. The method of claim 6, wherein the captured status data comprises temperature, fan speed, operating frequency, operating voltage, and hash rate.

19. The method of claim 8, wherein the captured status data comprises temperature, fan speed, operating frequency, operating voltage, and hash rate.

20. The method of claim 4, wherein the captured status data comprises temperature, fan speed, operating frequency, operating voltage, and hash rate.

* * * * *